United States Patent
Yu et al.

(10) Patent No.: US 7,643,906 B2
(45) Date of Patent: Jan. 5, 2010

(54) OBSTACLE AND CLIFF AVOIDING SYSTEM AND METHOD THEREOF

(75) Inventors: Hung-Hsiu Yu, Changhua County (TW); Kuo-Shih Tseng, Taichung County (TW); Yu-Lun Ho, Taipei County (TW); Mao-Feng Tu, Hsinchu County (TW); Chun-Hung Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 78 days.

(21) Appl. No.: 11/517,305

(22) Filed: Sep. 8, 2006

(65) Prior Publication Data
US 2007/0265740 A1  Nov. 15, 2007

(30) Foreign Application Priority Data
May 9, 2006  (TW) .............................. 95116355 A

(51) Int. Cl.
*B60R 25/04* (2006.01)
*B60R 25/06* (2006.01)

(52) U.S. Cl. ................. 700/255; 700/245; 700/253; 700/258

(58) Field of Classification Search ............ 701/23, 701/22; 180/167–169, 280
See application file for complete search history.

(56) References Cited

U.S. PATENT DOCUMENTS

| | | | |
|---|---|---|---|
| 6,389,329 B1* | 5/2002 | Colens | 700/262 |
| 6,493,612 B1* | 12/2002 | Bisset et al. | 701/23 |
| 6,594,844 B2 | 7/2003 | Jones | |
| 7,079,923 B2* | 7/2006 | Abramson et al. | 700/245 |
| 2002/0016649 A1* | 2/2002 | Jones | 700/245 |
| 2004/0143930 A1 | 7/2004 | Haegermarck | |

FOREIGN PATENT DOCUMENTS

| | | |
|---|---|---|
| JP | 11-91329 A | 8/1989 |
| JP | 8-72639 A | 3/1996 |
| JP | 2002-144278 A | 5/2002 |
| JP | 2004-224093 A | 8/2004 |
| JP | 2005-135400 A | 5/2005 |
| TW | 385622 | 3/1989 |
| TW | 285186 | 9/1996 |

* cited by examiner

*Primary Examiner*—Khoi Tran
*Assistant Examiner*—Bhavesh V Amin
(74) *Attorney, Agent, or Firm*—Birch, Stewart, Kolasch & Birch, LLP

(57) ABSTRACT

An obstacle and cliff avoiding system is disclosed, which is substantially a movable chassis having at least a displacement sensor arranged thereon. In a preferred embodiment, each displacement sensor is tilted by a specific angle with respect to a surface detected thereby while being driven to move in circle by a rotating apparatus for enabling the same to scan a defined fan-like area or the circular area around the chassis in a circulating manner. As each displacement sensor is tilted by the specific angle and is initiated to issue a working signal, the paths of signal emission and reception of each sensor are defined by the specific angle, whereas the reflected working signal received by the sensor is sent to a control unit to be compared with the working signal so that the control unit is able to evaluate whether there is an obstacle or a drop in front of the moving direction of the movable chassis and thus control the chassis to maneuver around the obstacle or the drop.

12 Claims, 4 Drawing Sheets

OBSTACLE AND CLIFF AVOIDING SYSTEM AND METHOD THEREOF

FIELD OF THE INVENTION

The present invention relates to an obstacle and cliff avoiding system and method, and more particularly, to an simple-structured and inexpensive movable chassis having at least a displacement sensor arranged therein for detecting whether there is an obstacle or a drop in front of the moving direction of the movable chassis and thus controlling the movable chassis to maneuver around the obstacle or the drop.

BACKGROUND OF THE INVENTION

When an autonomous mobile device, or a so-called robotic device, is operating in a specific working area, it is usually designed to move following a predefined algorithm. However, if there is an obstacle or a drop in the moving path of the autonomous mobile device, it is more than likely that the autonomous mobile device can be jammed by the obstacle or damaged when falling from the drop, and thus the autonomous mobile device is no longer operational. Therefore, it is essential that any autonomous mobile device must be equipped with certain obstacle/cliff avoiding apparatus.

Conventionally, an autonomous mobile device utilizes two sets of sensors as its obstacle/cliff avoiding apparatus, whereas the two sets of sensors are enabled to function independent to each other, and each can be an infrared sensor, an ultrasonic sensor, or a mechanical bumping sensor. Unfortunately, such conventional autonomous mobile devices usually are complicated and costly.

Please refer to FIG. 1, which is an autonomous cleaning apparatus disclosed in U.S. Pub. No. 20040143930, entitled "Obstacle Sensing System for an Autonomous Cleaning Apparatus". As seen in FIG. 1, the obstacle sensing system of the autonomous cleaning apparatus is primarily a front bumper part 11, being movably arranged in front of a chassis 10 of the cleaning apparatus, by which, when the front bumper part 11 encounters and obstacle or obstruction, the movement between the chassis 10 and the front bumper part 11 can be sensed and causes a control signal to be transmitted to the guidance system, and then the guidance system can maneuver the cleaning apparatus around the obstacle or obstruction. However, the aforesaid obstacle sensing system can only sense an obstacle when the apparatus applying the same had come into contact with the obstacle directly, such that the aforesaid obstacle sensing system is considered less efficient and can be easily damaged after several collisions.

Please refer to FIG. 2, which is a robot obstacle detection system disclosed in U.S. Pat. No. 6,594,844. The robot obstacle detection system 20 of FIG. 2 employs a plurality of sensors 21, 22 as its primary detection means, whereas each sensor includes an optical emitter which emits a directed beam having a defined field of emission and a photon detector having a defined field of view which intersects the field of emission of the emitter at a region. As seen in FIG. 2, the sensors 21 are arranged in front of the robot 23 for detecting obstacles or walls blocking the moving path of robot 23, and the sensors 22 are arranged at the bottom of the robot 23 for detecting a drop, by which the robot 23 is enabled to maneuver around the obstacle or drops. However, as the angle of detection of each sensors 21, 22 is fixed, it is required to have a plurality of sensors 21, 22 arranged in the robot 23 for widening the detection angle and thus avoiding blind spot. However, as there are more than one sensor 21, 22 required in the robot 23, the robot obstacle detection system 20 is complicated and costly.

SUMMARY OF THE INVENTION

In view of the disadvantages of prior art, the primary object of the present invention is to provide a simple-structured and inexpensive obstacle and cliff avoiding system comprising at least a displacement sensor, arranged in a movable apparatus, each capable of detecting simultaneously whether there is an obstacle or a drop in front of the moving direction of the movable apparatus.

To achieve the above object, the present invention provides an obstacle and cliff avoiding system, which comprises: a housing; at least a driving wheel, arranged in the housing for supporting the same while driving the same to move accordingly; at least a displacement sensor, each arranged in the housing, capable of emitting and receiving working signals; and a control unit, for receiving signals transmitted from each displacement sensor and making an evaluation to determine whether there is an obstacle or a drop in front of the moving direction of the housing, and thus issuing a control signal for controlling the housing to maneuver around the obstacle or the drop; wherein, the paths of signal emission and reception of each displacement sensor are tilted by a specific angle with respect to a planar surface defined by the housing.

Preferably, each displacement sensor can be a device selected from the group consisting of an optical sensor, an acoustic wave sensor and the combination thereof.

Preferably, the specific angle is ranged between 0 degree and 90 degree.

Preferably, the obstacle and cliff avoiding system further comprises a rotating apparatus for driving each displacement sensor to rotate accordingly.

Preferably, the rotating apparatus is capable of driving each displacement sensor to rotate back and forth within a specific angle for enabling the same to scan a defined fan-like area.

Preferably, the rotating apparatus is capable of driving each displacement sensor to rotate back and forth the whole circle for enabling the same to scan a circular area around the housing in a circulating manner.

Moreover, to achieve the above object, the present invention provides an obstacle and cliff avoiding method, adapted to be applied by at least a displacement sensor arranged on a movable housing while each displacement sensor is enabled to scan area with respect to the moving direction of the movable housing, which comprises steps of: orientating the paths of signal emission and reception of each displacement sensor to be tilted by a specific angle with respect to a planar surface defined by the housing while initiating each displacement sensor; enabling each displacement sensor to transmit as well as receive signals while transmitting signals received thereby to a control unit; and enabling the control unit to receive the signals transmitted from each displacement sensor while enabling the same to make perform an operation upon the received signals and thus issue a command accordingly.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 3C:
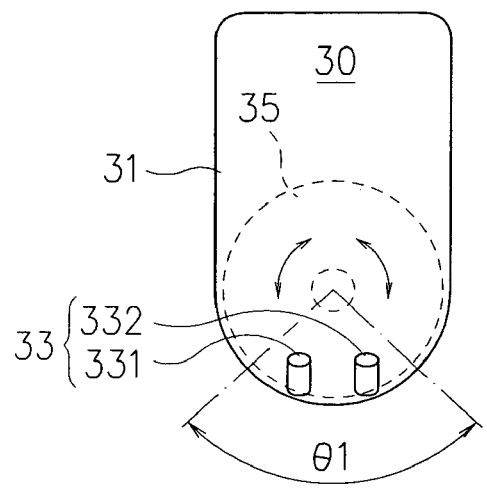
FIG. 3C is a top view of FIG. 3A.
Figure 3A:
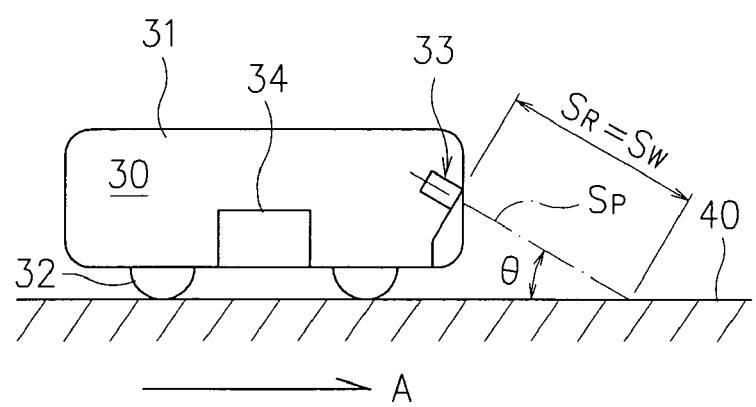
FIG. 3A is a schematic view of an obstacle and cliff avoiding system according to a preferred embodiment of the invention.
Figure 3B:
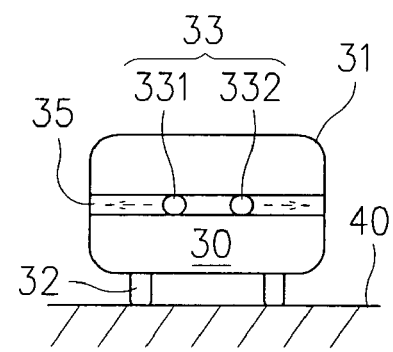
FIG. 3B is a side view of FIG. 3A.

Please refer to FIG. 3A to FIG. 3C, which are a schematic diagram, a side view and a top view of an obstacle and cliff avoiding system according to a preferred embodiment of the invention. The obstacle and cliff avoiding system 30 is arranged inside a housing 31, which is supported and driven to move by at least a driving wheel 32, arranged at the bottom of the housing 31. Moreover, at least a displacement sensor 33 is arranged on the housing 31, that the sensor 33 can be an optical sensor, an acoustic wave sensor or the combination thereof. Each displacement sensor 33 is composed of: a signal emitter 331, for emitting a signal; and a signal receiver 332, for receiving a reflected signal $S_R$. In addition, the paths $S_P$ of signal emission and reception of the signal emitter 331 and signal receiver 332 of each displacement sensor 33 are tilted by a specific angle θ with respect to a planar surface 40 defined by the housing 31, while the signal emitting operation of the signal emitter 331 and the signal reception of the signal receiver 332 are controlled by a control unit 34, which is also capable of processing the reflected signal $S_R$ received by the signal receiver 332. Moreover, the specific angle is ranged between 0 degree and 90 degree.

As seen in FIG. 3B and FIG. 3C, the displacement sensor 33 is disposed on a rotating apparatus 35, such that the rotating apparatus drives the displacement sensor 33 to rotate back and forth within a specific angle $θ_1$ for enabling the same to scan a defined fan-like area, or drives the displacement sensor 33 to rotate back and forth the whole circle for enabling the same to scan a circular area around the housing 31 in a circulating manner. As the rotating apparatus 35 is enabled to rotate the whole circle around the housing 31, the displacement sensor 33 is not limited to only scan the area in the moving direction A of the housing 31. In a preferred aspect, the rotation of the rotating apparatus 35 can be realized by the cooperation of components, such as gears, transmission belts or chains, etc., which are known to those skilled in the art and not going to describe further herein.

Figure 4:
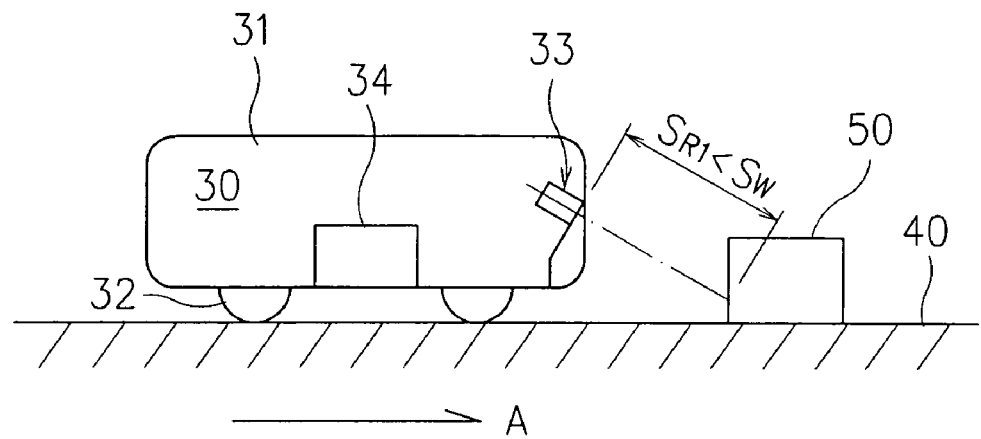
FIG. 4 is a schematic diagram illustrating the encountering of an obstacle and cliff avoiding system of the invention to an obstacle.
Figure 5:
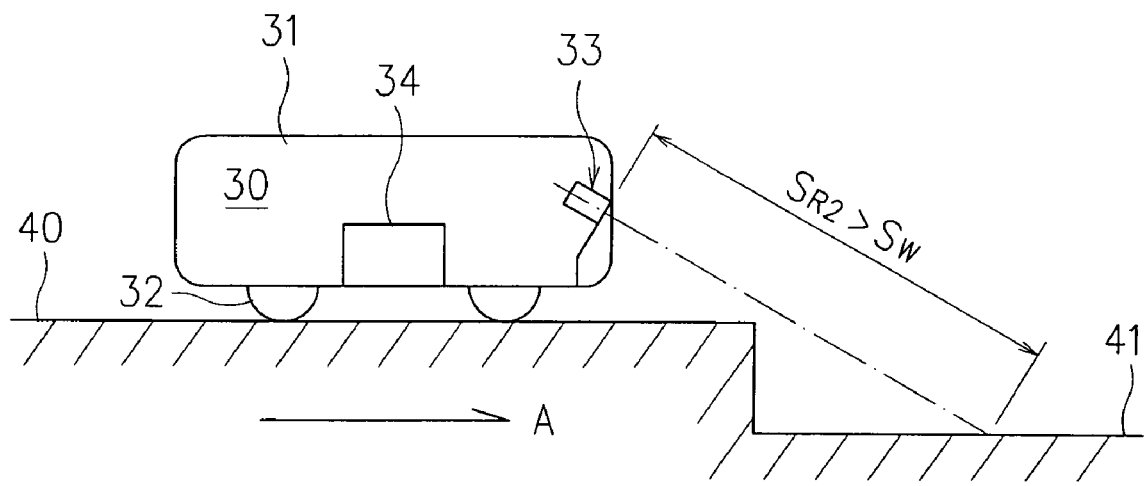
FIG. 5 is a schematic diagram illustrating the encountering of an obstacle and cliff avoiding system of the invention to a drop.

Assuming the device shown in FIG. 3A is just been initiated, a working signal $S_W$ is defined to be equal to the reflected signal $S_R$ of that initiating moment, i.e. let $S_W=S_R$, while storing the $S_W$ in the control unit 34. When the housing 31 encounters an obstacle 50 disposed on a planar surface 40 as shown in FIG. 4, the blocking of the obstacle 50 will cause the magnitude of the reflected signal $S_{R1}$ to reduce, so that as the reflected signal $S_{R1}$ is received by the displacement sensor 33 and further transmitted to the control unit 34, the control unit 34 will start an evaluation to determine whether there is an obstacle or a drop in front of the moving direction of the housing 31 by comparing the reflected signal $S_{R1}$ with the stored working signal $S_W$. If the comparison shows that $S_{R1}<S_W$, the control unit 34 is informed with the presence of the obstacle 50 and thus the control unit 34 will enable an obstacle avoiding algorithm to issue a command for stopping the moving of the housing 31, or for directing the housing 31 to maneuver around the obstacle 50. Moreover, when the housing 31 encounters a drop 41, which can be a recess in the planar surface 40, as shown in FIG. 5, the drop 41 will cause the magnitude of the reflected signal $S_{R2}$ to increase, so that as the reflected signal $S_{R2}$ is received by the displacement sensor 33 and further transmitted to the control unit 34, the control unit 34 will start an evaluation to determine whether there is an obstacle or a drop in front of the moving direction of the housing 31 by comparing the reflected signal $S_{R2}$ with the stored working signal $S_W$. If the comparison shows that $S_{R2}>S_W$, the control unit 34 is informed with the presence of the drop 41 and thus the control unit 34 will enable a cliff avoiding algorithm to issue a command for stopping the moving of the housing 31, or for directing the housing 31 to maneuver around the drop 41.

Figure 6:
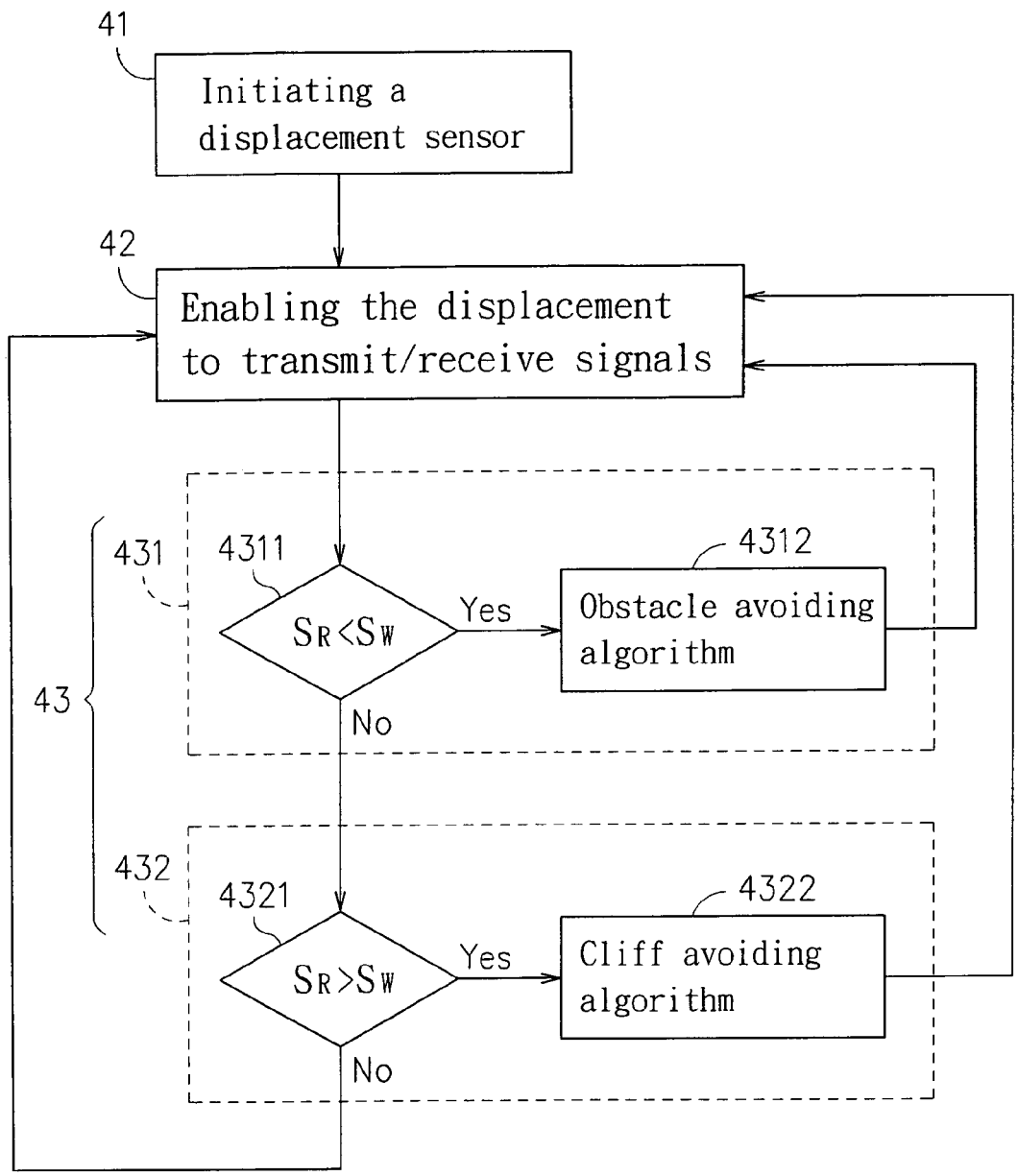
FIG. 6 is a schematic diagram depicting steps of an obstacle and cliff avoiding of the present invention.

Please refer to FIG. 6, which is a schematic diagram depicting steps of an obstacle and cliff avoiding of the present invention. Summing up from the above description, an obstacle and cliff avoiding method 40 can be concluded, which comprises steps of:

Step 41: initiating a displacement sensor 33; whereas the paths of signal emission and reception of the displacement sensor 33 are tilted by a specific angle with respect to a planar surface defined by the housing 31 while initiating the displacement sensor 33;

Step 42: enabling the displacement sensor 33 to transmit as well as receive signals while transmitting signals received thereby to a control unit 34; whereas the reflected signal $S_R$ is transmitted to the control unit 34 as the initiating working signal $S_W$ is obtained and stored in the control unit 34;

Step 43: enabling the control unit 34 to perform an operation upon the received signals and thus issue a command accordingly; wherein the operation comprises steps of an obstacle avoiding step 431 and a cliff avoiding step 432, which are performed as following description: The operation starts at step 4311 of the obstacle avoiding step 431. In step 4311, an evaluation is made to determine whether the received reflected signal $S_R$ is smaller than the stored working signal $S_W$; if so, then the flow proceeds to step 4312 for enabling an obstacle avoiding algorithm and then return back to step 42 as the abnormal is eliminated; otherwise, the flow proceeds to step 4321 of the cliff avoiding step 432. In step 4321, an evaluation is made to determine whether the received reflected signal $S_R$ is larger than the stored working signal $S_W$; if so, then the flow proceeds to step 4322 for enabling a cliff avoiding algorithm and then return back to step 42 as the abnormal is no longer exit; otherwise, the flow returns to step 42. It is noted that the elimination of the abovementioned abnormal can be defined as that the control unit 34 is enabled to issue a command for stopping the moving of the housing 31, or for directing the housing 31 to maneuver around the obstacle or drop, that the elimination step can be included in the two avoiding algorithms and thus is not described further herein with reference to FIG. 6. Furthermore, instead of performing the obstacle avoiding algorithm ahead of the cliff avoiding algorithm as the embodiment shown in FIG.

6, the cliff avoiding algorithm can be performed ahead of the obstacle avoiding algorithm.

Figure 1:
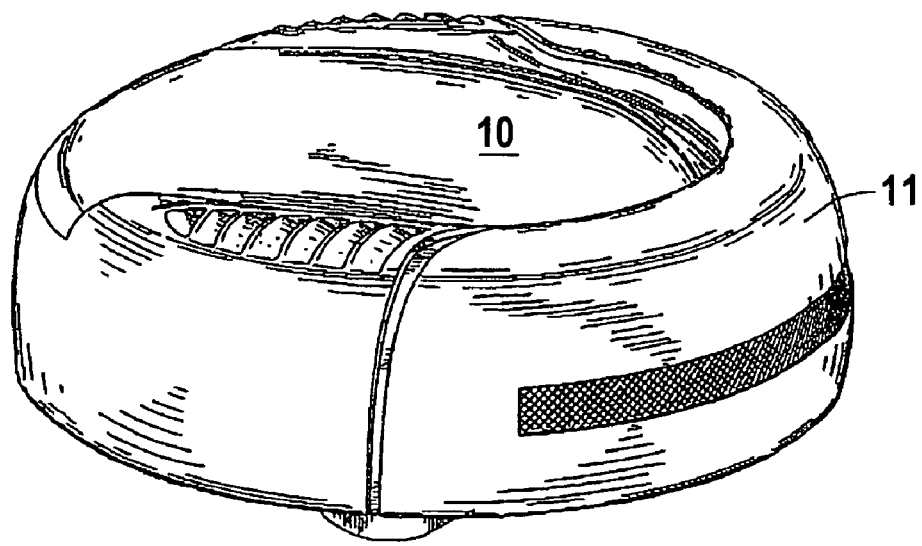
FIG. 1 is an autonomous cleaning apparatus disclosed in U.S. Pub. No. 20040143930.
Figure 2:
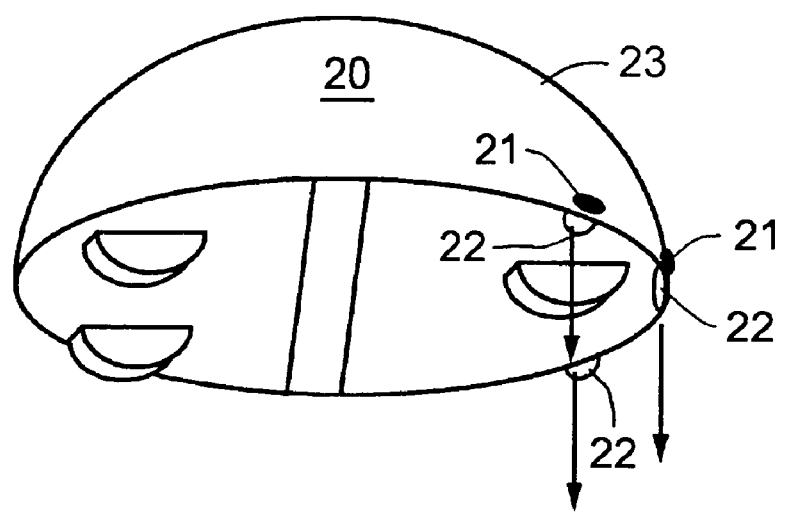
FIG. 2 is a robot obstacle detection system disclosed in U.S. Pat. No. 6,594,844.

Since the obstacle and cliff avoiding system of the invention utilizes the variation of voltage signal to determine whether there is an obstacle or a drop, which is different from those use the switch of infrared for detection as that shown in FIG. 2, only one set of sensor is required for enabling the system to detect an obstacle and a drop simultaneously. Therefore, not only the structure of the invention can be simplified, but also the cost of manufacturing the same is reduced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An obstacle and cliff avoiding system, comprising:
   a housing;
   at least a driving wheel, arranged in the housing for supporting the housing while driving the housing to move accordingly;
   a single displacement sensor, arranged in the housing, capable of emitting and receiving working signals;
   a rotating apparatus configured to drive the single displacement sensor to rotate independently of the housing; and
   a control unit configured to receive signals transmitted from the single displacement sensor and make an evaluation only based on the signals transmitted from the single displacement sensor to determine presence of an obstacle and a drop in front of the moving direction of the housing, and thus issue a control signal for controlling the housing to maneuver around the obstacle or the drop;
   wherein, the paths of signal emission and reception of the single displacement sensor are tilted by a specific angle with respect to a planar surface defined by the housing, and
   wherein the rotating apparatus is configured to independently drive the single displacement sensor to rotate back and forth within a specific angle for enabling the single displacement sensor to scan a defined fan-like area.

2. The obstacle and cliff avoiding system of claim 1, wherein the single displacement sensor is a device selected from the group consisting of an optical sensor, an acoustic wave sensor and the combination thereof.

3. The obstacle and cliff avoiding system of claim 1, wherein the specific angle is ranged between 0 degree and 90 degree.

4. The obstacle and cliff avoiding system of claim 1, wherein the rotating apparatus is capable of driving the single displacement sensor to rotate back and forth the whole circle for enabling the same to scan a circular area around the housing in a circulating manner.

5. An obstacle and cliff avoiding system, comprising:
   a housing;
   at least a driving wheel, arranged in the housing for supporting the housing while driving the housing to move accordingly;
   a single displacement sensor, arranged in the housing, capable of emitting and receiving working signals;
   a rotating apparatus configured to drive the single displacement sensor to rotate independently of the housing; and
   a control unit configured to receive signals transmitted from the single displacement sensor and make an evaluation only based on the signals transmitted from the single displacement sensor to determine presence of an obstacle and a drop in front of the moving direction of the housing, and thus issue a control signal for controlling the housing to maneuver around the obstacle or the drop;
   wherein, the paths of signal emission and reception of the single displacement sensor are tilted by a specific angle with respect to a planar surface defined by the housing, and
   wherein the rotating apparatus is configured to independently drive the single displacement sensor to rotate back and forth in a manner selected from the group consisting of: rotating within a specific angle for enabling the single displacement sensor to scan a defined fan-like area; and rotating the whole circle for enabling the single displacement sensor to scan a circular area around the housing in a circulating manner.

6. The obstacle and cliff avoiding system of claim 5, wherein the single displacement sensor is a device selected from the group consisting of an optical sensor, an acoustic wave sensor and the combination thereof.

7. The obstacle and cliff avoiding system of claim 5, wherein the specific angle is ranged between 0 degree and 90 degree.

8. An obstacle and cliff avoiding method, adapted to be applied by a single displacement sensor arranged on a movable housing while the single displacement sensor is rotated independently of the housing to scan area, comprising steps of:
   orientating the paths of signal emission and reception of the single displacement sensor to be tilted by a specific angle with respect to a planar surface defined by the housing while initiating the single displacement sensor;
   enabling the single displacement sensor to transmit as well as receive signals while transmitting signals received thereby to a control unit; and
   enabling the control unit to receive the signals transmitted from the single displacement sensor and enabling the control unit to make an evaluation only based on the signals transmitted from the single displacement sensor to determine presence of an obstacle and a drop and thus issue a command accordingly,
   wherein an working signal is generated as the single displacement sensor is initiated;
   wherein the working signal is transmitted to the control unit to be compared with the signal received thereby;
   wherein an obstacle avoiding algorithm is being performed as the signal from the single displacement sensor received by the control unit is larger than the working signal; and
   wherein a cliff avoiding algorithm is being performed as the signal from the single displacement sensor received by the control unit is smaller than the working signal.

9. The obstacle and cliff avoiding method of claim 8, wherein the specific angle is ranged between 0 degree and 90 degree.

10. The obstacle and cliff avoiding method of claim 8, wherein the single displacement sensor is a device selected from the group consisting of an optical sensor, an acoustic wave sensor and the combination thereof.

11. The obstacle and cliff avoiding method of claim 8, wherein the single displacement sensor is driven to rotate while scanning by a rotating apparatus.

12. The obstacle and cliff avoiding method of claim 11, wherein the rotating apparatus is capable of driving the single displacement sensor to rotate back and forth in a manner selected from the group consisting of: rotating within a specific angle for enabling the same to scan a defined fan-like area; and rotating the whole circle for enabling the same to scan a circular area around the housing in a circulating manner.

* * * * *